United States Patent Office 3,509,911
Patented May 5, 1970

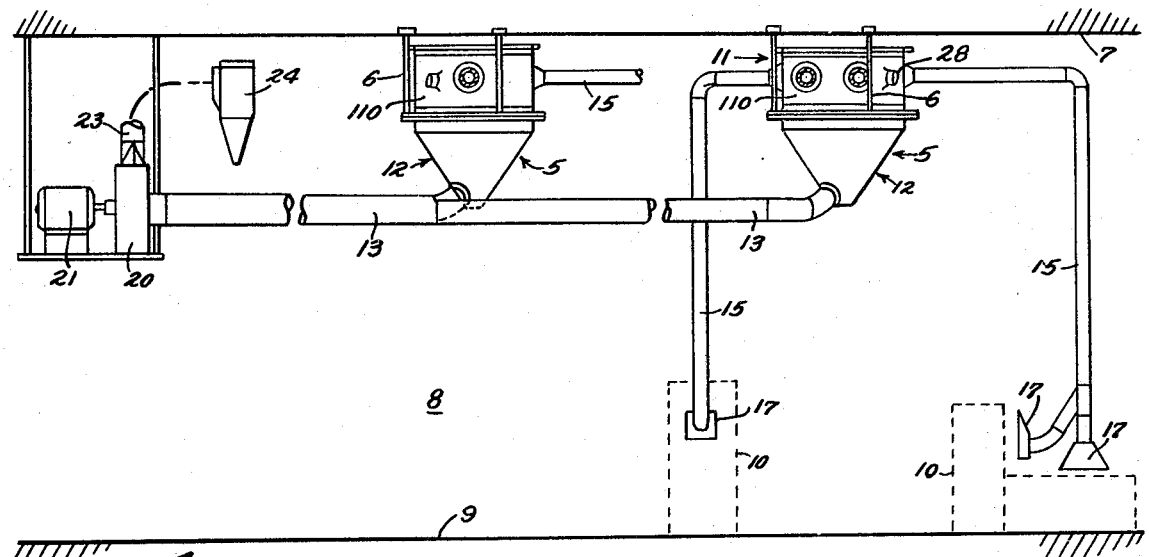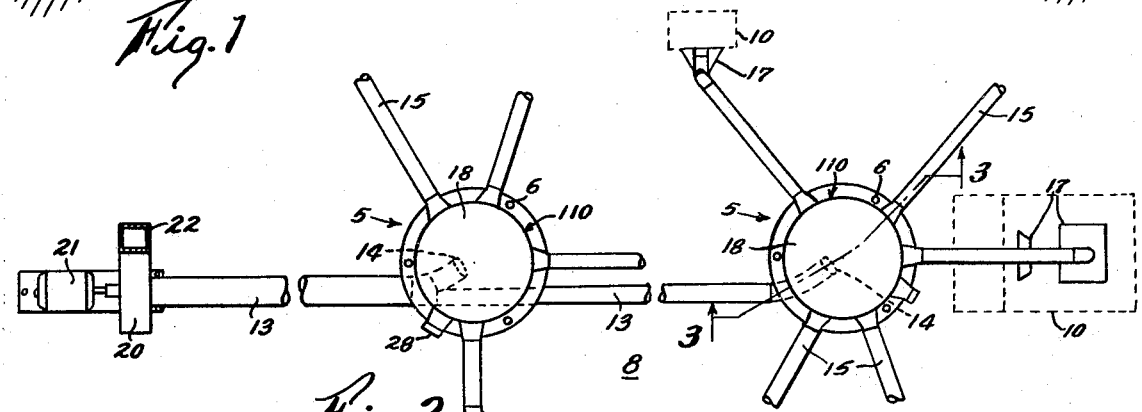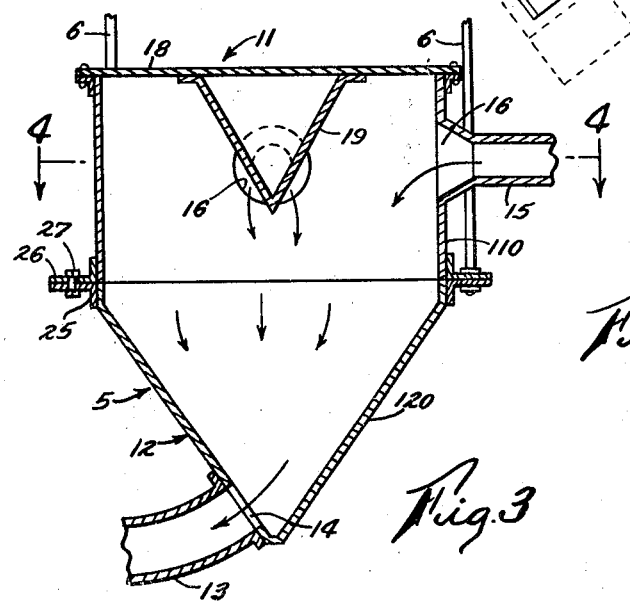

3,509,911
DUST COLLECTING PLENUM INSTALLATION
Eugene A. Carsey, Cincinnati, Ohio, assignor to The Kirk & Blum Manufacturing Co., Cincinnati, Ohio, a corporation of Ohio
Filed Sept. 2, 1966, Ser. No. 576,951
Int. Cl. B65g 53/00
U.S. Cl. 137—602        1 Claim

ABSTRACT OF THE DISCLOSURE

A circular dust collecting plenum adapted for permanent installation in a manufacturing area and having a variable number of dust feeder pipes radiating from its upper circular portion for connections with suitable, dust entraining hoods, and a main exhaust pipe connected to the restricted bottom of a lower inverted cone-shaped portion of the plenum, said main exhaust pipe being adapted to discharge into a cyclone dust separator.

---

The present invention relates o improvements in dust collecting plenum installations and is directed to an alterable plenum that can be permanently installed centrally of a particular manufacturing area and which is capable of modification and adaption to permit relocation and/or change within the area of the number and kinds of machinery units requiring dust collecting facilities.

An object of the invention is to provide an improved and greatly simplified dust collecting plenum rated and constructed to handle the projected maximum dust removal requirements of a particular manufacturing area and which provides a centrally located and fixed dust, chips and manufacturing refuse collecting hopper adaptable to serve an indeterminate number of branch feeder lines radiating therefrom.

Another object of the invention is to provide a dust collecting plenum that has a gravity assisted dust flow which is self-cleaning and is free from all obstructions that might cause retention of dust and the consequent build up of the dust that would clog the plenum and result in its inefficient operation.

Other objects of the invention will become apparent from the following specification taken in conjunction with the accompanying drawings depicting a preferred embodiment thereof.

In the drawings:

FIG. 1 is a side elevational view of a typical manufacturing area with the plenums of this invention installed therein.

FIG. 2 is a top plan view of the manufacturing area and the plenums shown in FIG. 1.

FIG. 3 is an enlarged section taken on line 3—3 of FIG. 2.

FIG. 4 is a section taken on line 4—4 of FIG. 3.

In the drawings the reference numerals 5 indicate two of my dust collecting plenums mounted as by suspending rods or braces 6 from the ceiling 7 of a manufacturing area 8. On the floor 9 of the area are arranged a number of production machine units 10 which create dust, chips and other refuse particulate and it is understood that machine units in the area are often rearranged, added to or removed in order to carry out production methods within said factory area.

As best shown in FIGS. 3 and 4 the dust collecting plenum 5 of this invention comprises a hollow, cylindrically shaped branch pipe engaging upper portion 11 and a hollow, inverted cone-shaped lower portion 12 joined together in axial alignment and in open communication with each other. A main suction pipe 13 is connected to the restricted bottom of the lower portion 12 and communicates with the hopper interior through an opening 14 made through the hopper casing 120. A selected number of branch feeder pipes 15 radiate from and are connected to the upper portion 11, each pipe being in communication with the interior of the upper section through an opening 16 formed through a casing 110 therefor.

As illustrated in FIGS. 1 and 2 of the drawings, the remote ends of the branch feeder pipes are connected to hoods, booths or nozzles 17 located adjacent the machinery units 10 and each of which is adapted to entrain chips, dust and other manufacturing particulate and refuse created by the adjacent unit.

The top of the plenum is closed by a cover 18 which has a circular and preferably inverted cone-shaped baffle 19 fixed to and depending from its central portion, said baffle depending into the upper plenum portion to a point somewhat beneath the common level for the bottoms of the openings 16 of the branch feeder pipes 15.

Each of my plenums 5 serve a particular manufacturing area but several exhaust mains 13 from a plurality of plenums may be connected to the intake end of a single fan 20 that is driven, as by an electric motor 21. The exhaust side 22 of the fan may be connected by a pipe 23 (FIG. 1) to a cyclone dust separator 24, if desired.

With reference to FIGS. 3 and 4 it will be seen that casings for the upper and lower plenum portions are joined together by means of circular ring members that preferably take the form of an angle iron 25 riveted, or otherwise connected to the lower casing 120 and a cooperating circular ring member which also is an angle iron 26 connected to the upper casing 110, said angle irons being secured together as by bolts 27. The plenum may be suspended from the ceiling by pasisng the lower ends of the rods 6 through the ring members and either welding or bolting the ends of said rods to the ring members.

It will therefore be seen that one or more of my circular plenums can be permanently installed in a particular manufacturing area, the capacity being determined by projecting the future maximum dust collecting requirements of that area. In this respect the total projected branch feeder pipe area should not exceed the main exhaust pipe area by more than 30% to secure efficient dust removing characteristics. Once a plenum or plenums, their main exhaust pipes and exhaust fans have been installed in a particular manufacturing area, radiating branch pipes 15 can be connected to the plenum as required for the number and location of machinery units in the area 8; it being understood that when certain machinery served by a branch pipe is removed, the opening 16 for that pipe may be capped off as at 28 and the branch pipe removed. Also the plenum is susceptible of serving new dust creating machinery merely by forming another hole 16 in the plenum for connection to a new radiating branch feeder pipe adapted to serve that particular machinery.

In operation the fan 20 is driven at full capacity and exhausts air through the main exhaust pipe 13, such movement creating high velocity, dust entraining air around the hoods, nozzles, etc. near the machinery units thus entraining all dust therearound and carrying it through the branch pipes 15 to the plenum 5. As indicated in FIG. 3 the dust transmitted by the branch feeder pipes to the plenum will fall directly downwardly assisted by gravity into the restricted bottom of the hopper 12 and thence through the main exhaust pipe 13 to the fan 20 and from there through the dust separating cyclone 24, or the like.

What is claimed is:

1. A dust collecting plenum adapted for mounting centrally above a manufacturing area that has a number of dust collecting hoods each positioned beside a machinery unit therein and consisting of an upstanding, cylindrically shaped upper wall portion, a number of cappable inlet openings formed in the upper wall portion, an inverted, cone-shaped lower wall portion having its top edge connected to and depending from the lower edge of the upper wall portion, a top wall closing the upper end of the upper wall portion, and an inverted, cone shaped baffle means mounted on the central interior part of the top wall and depending downwardly to at least the level of the lower portion of the inlet openings, a main exhaust pipe connected into the bottom of the lower wall portion and in open communication with the internal restricted lower portion of the plenum, a source of exhaust pressure for the main pipe, the capacities of the plenum and its said exhaust source being predetermined and built into the plenum by a projection of the future maximum dust collecting requirements for said manufacturing area, a pipe fitting connected to the inlet openings, and a branch feeder pipe radiating from a fitting and having its remote end connected to a dust collecting hood.

References Cited

UNITED STATES PATENTS

| | | | |
|---|---|---|---|
| 1,023,082 | 4/1912 | Kluge | 209—144 |
| 1,224,898 | 5/1917 | Brennen | 209—144 |
| 1,676,969 | 7/1928 | Sutton et al. | 302—27 |
| 1,758,668 | 5/1930 | Kirk et al. | 302—27 |
| 1,842,409 | 1/1932 | Kirk et al. | 302—27 |
| 1,568,772 | 1/1926 | Rubin | 137—603 X |
| 2,738,962 | 3/1956 | Goodrie | 137—603 X |

FOREIGN PATENTS 45,911    12/1906    Austria.

M. CARY NELSON, Primary Examiner

W. R. CLINE, Assistant Examiner

U.S. Cl. X.R.

302—27